C. MAUL.
HYDROPNEUMATIC GAGING APPARATUS.
APPLICATION FILED DEC. 19, 1914.
1,159,518.
Patented Nov. 9, 1915.
2 SHEETS—SHEET 2.
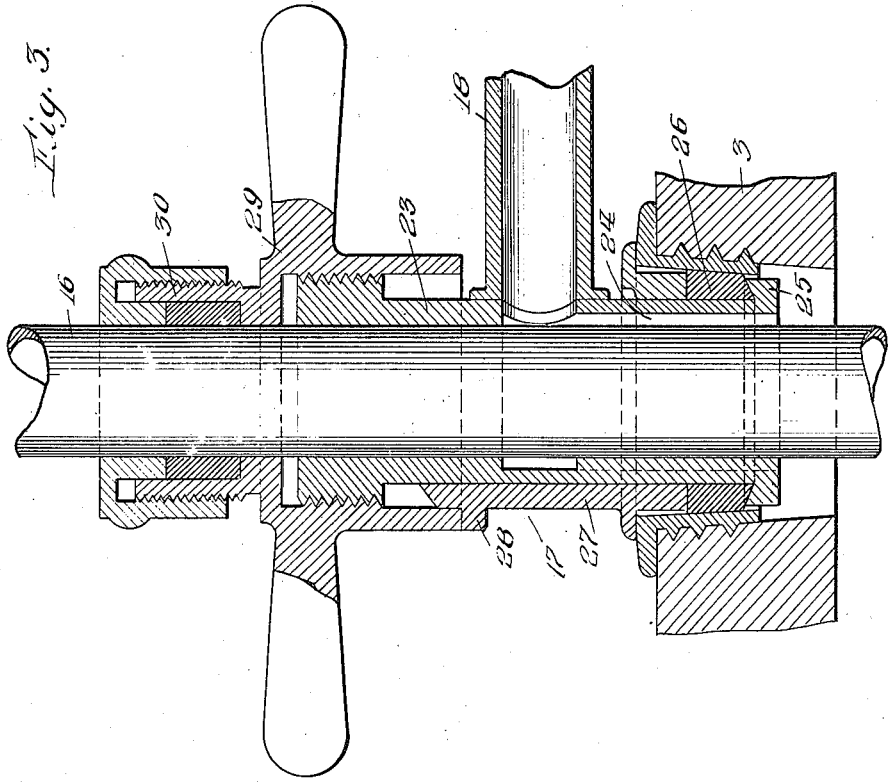
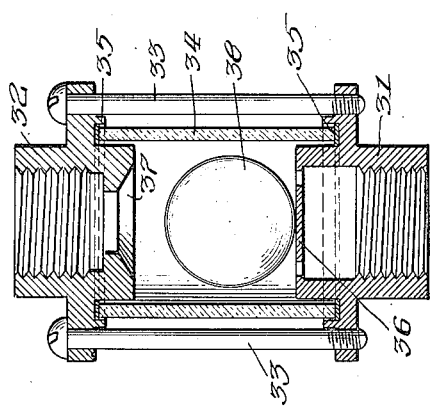
WITNESSES:
L. B. Graham
A. J. Crane
INVENTOR:
Christ Maul,
By Brown, Nissen & Sprinkle,
ATT'YS.

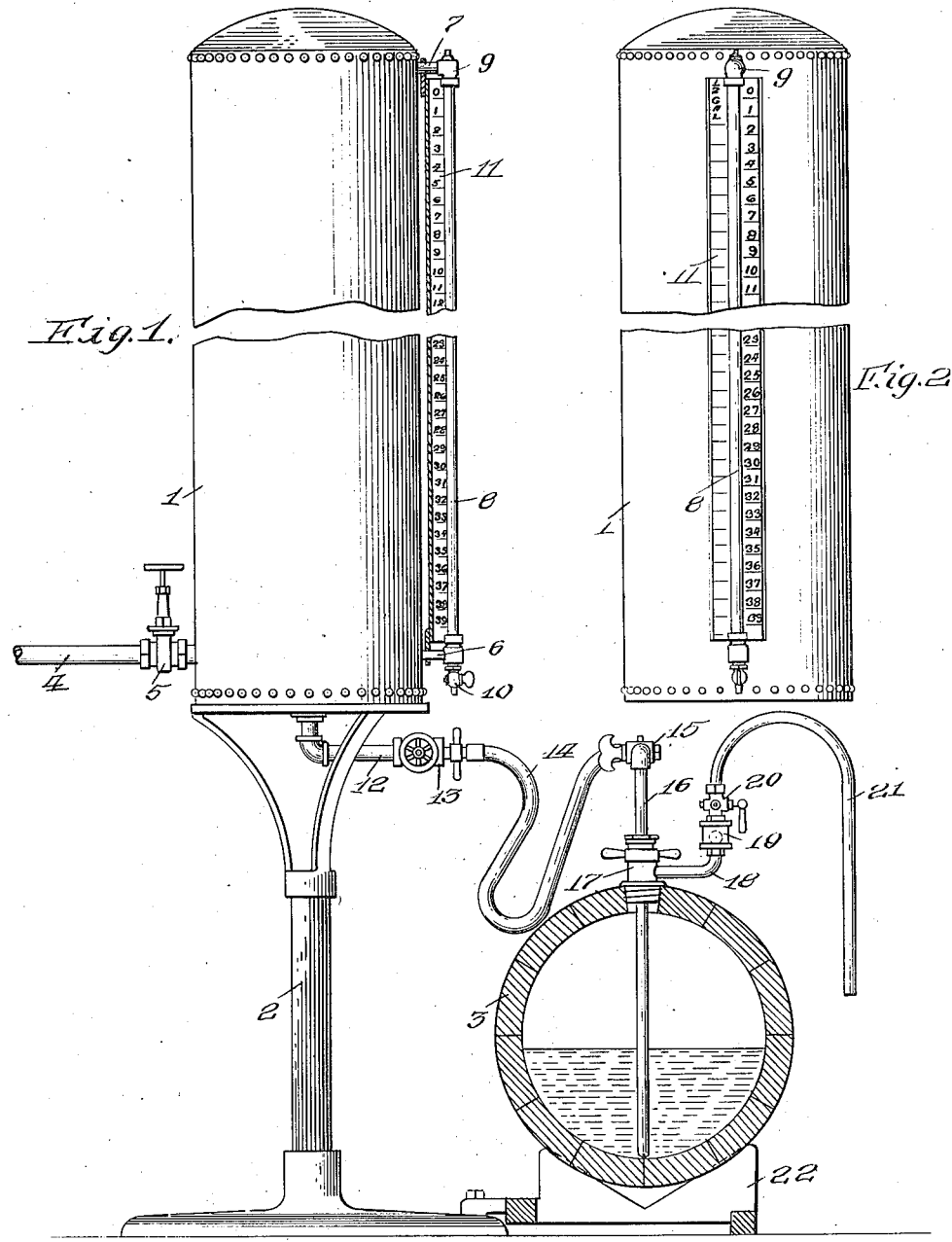

UNITED STATES PATENT OFFICE.

CHRIST MAUL, OF CHICAGO, ILLINOIS, ASSIGNOR TO A. MAGNUS SONS COMPANY, OF CHICAGO, ILLINOIS, A CORPORATION OF ILLINOIS.

HYDROPNEUMATIC GAGING APPARATUS.

1,159,518. Specification of Letters Patent. Patented Nov. 9, 1915.

Application filed December 19, 1914. Serial No. 878,024.

*To all whom it may concern:*

Be it known that I, CHRIST MAUL, a citizen of the United States, residing in Chicago, in the county of Cook, State of Illinois, have invented certain new and useful Improvements in Hydropneumatic Gaging Apparatus, of which the following is a specification.

This invention relates to measuring devices for barrels, kegs, and other containers.

The invention consists substantially in the combination and arrangement hereinafter described and illustrated in the accompanying drawings, and more particularly set forth in the appended claims.

In the drawings: Figure 1 is a side elevation of the complete device and the barrel to which the device is applied being shown in section. Fig. 2 is a front elevation of the measuring tank or reservoir showing the gage glass and scale. Fig. 3 is a sectional view of the bunging device. Fig. 4 is a sectional view of the observing lantern and check valve.

In this invention, a tank 1 mounted on a suitable base 2 is provided for holding the liquid, preferably water, used in measuring the capacity of a vessel such as that shown at 3. The tank 1 has a connection 4 provided with a valve 5 communicating with any source of liquid supply for initially filling the tank. After the tank is once filled, the valve 5 is kept closed, and the water in the tank used over and over again for measuring vessels. Communicating with the top and bottom of the tank 1 respectively are pipes 6 and 7 connected with the gage glass 8. The gage glass 8 has free communication with the atmosphere at its upper end through an opening in the fitting 9, and is provided with a vent-cock 10 at the lower end thereof. Fastened to the tank behind the gage glass is an angular scale 11, one surface of which is graduated so as to measure in gallons the amount of liquid allowed to flow from the tank at any one time. The other surface of the scale is provided with half gallon graduations. Connected to the bottom of the tank, and communicating with the interior thereof is a pipe 12 adapted to be closed by a valve 13. Connected to the end of the pipe 12 is a flexible tube 14, preferably a rubber hose. The tube 14 is connected to the upper end of the pipe 16, and a valve 15 is provided for opening and closing the upper end of the pipe 16. The pipe 16 is adapted to be inserted into a barrel or keg through the bung-hole thereof, and a bunging device 17, to be later described, is provided for sealing the opening about the pipe 16. A stand 22 attached to the base 2 is provided for holding the barrel 3 in place while it is being measured. A pipe 18 communicates with the interior of the barrel 3 through the bunging device 17, and is provided with a check valve and observing lantern 19 to be later described, and also with a three-way valve 20 arranged to connect the pipe 18 alternately with the atmosphere and with a source of pneumatic pressure through the pipe 21.

The bunging device 17 includes a member 23 fitted about the pipe 16, and having an opening 24, which communicates with the interior of the barrel being measured, and also with the interior of the pipe 18 as shown in Fig. 3. Upon the lower end of the member 23 is an integral ring or abutment 25 having upwardly beveled edges adapted to hold a gasket 26, preferably made of rubber or similar material. Resting on the upper part of the gasket 26 is a circular member 27 surrounding the member 23 and having a shoulder 28 on which rests the interiorly threaded member 29. The member 29 is threaded upon the upper end of the member 23. A stuffing box or gland 30 is attached to the upper end of the member 29 and surrounds the pipe 16. When the bunging device is inserted in the barrel or keg, the member 29 is turned so as to press downwardly on the shoulder 28, and at the same time pull upwardly upon the member 23, thus compressing the rubber gasket 26 and causing it to expand laterally and make an air tight connection between the bunging device and the barrel. The only communication to the barrel is then through the pipe 16 or the pipe 18.

Connected with the pipe 18, by means of a fitting 31, is an observing lantern and check valve 19 shown in detail in Fig. 4. The upper end of the observing lantern is provided with a fitting 32, and the fittings 31 and 32 are connected by means of bolts 33. A cylinder or tube 34, preferably of glass, extends between the fittings 31 and 32, and is provided with packing rings 35 so as to make an air tight connection between the fittings and the glass. The upper end of the fitting 31 is provided with a screen 36, and the lower end of the fitting 32 is provided with a beveled valve-seat 37. On the interior of the glass cylinder 34 is provided a ball-valve 38.

The operation of the device is as follows: The valves 5 and 15 being closed and the tank 1 filled with water until the water in the gage 8 registers with the zero reading on the scale 11, the barrel or keg 3 is placed on the stand 22 with the bung-hole at the top of the barrel. The pipe 16 is now inserted through the bung-hole and the bunging device 17 tightened to make air tight connection with the barrel. The valve 20 is turned so that the opening 24 communicates through the pipe 18 with the atmosphere. The valve 15 is now opened, and water runs from the tank 1 through the pipes 14 and 16 into the barrel, forcing the air out of the barrel through the pipe 18 and valve 20. The air passes freely through the observing lantern 19, since the ball-valve 38 rests upon the screen 36 leaving a free passage through the lantern. When the water has filled the barrel, and begins to rise in the pipe 18, it lifts the ball-valve 38 into contact with the valve-seat 37, and closes the passage so that no more water can flow into the barrel. When the valve rises in the lantern, the operator knows that the barrel is full. It will be noted that in addition to the water required to fill the barrel, a certain amount of water has been used to fill the pipe 18, and the portion of the pipe 16 above the barrel. The parts of the device are so proportioned that the water necessary to fill these pipes is equal to the water displaced by the portion of the pipe 16 on the inside of the barrel. The amount of water that has been drawn from the tank 1 is therefore equal to the amount required to fill the barrel, and this amount is ascertained by the readings on the scale 11 opposite the top of the water in the gage valve 8. After the reading has been taken the valve 20 is turned to connect the pipe 18 with the source of pneumatic pressure through the pipe 21. This pneumatic pressure is sufficient to overcome the pressure due to the liquid in the tank 1, and forces the ball-valve 38 out of contact with the seat 37, and the water out of the pipe 18 back into the barrel through the opening 24. As the air enters the barrel through the opening 24, it spreads out over the top of the water, forcing the water down to the bottom of the barrel and up through the pipe 16, and thence back into the tank 1. Since the pipe 16 is brought as near as possible to the bottom of the barrel, practically all of the water will be forced out of the barrel into the tank 1. The valve 15 may now be closed, the bunging device 17 released, the pipe 16 removed from the barrel, and the barrel replaced by another to be measured.

I claim:

1. In combination, means for supplying liquid to various vessels to be measured, said means being detachable from said vessels to permit the supplying of said liquid to a number of said vessels in succession, means for returning the liquid to the first said means and means for measuring the amount of liquid so transferred.

2. In a measuring device for a vessel, a source for supplying a liquid, means to conduct the liquid to various vessels to be measured, said means being detachable from said vessels to permit attachment thereof to a number of vessels in succession, means for returning the liquid to the source of supply, and means for measuring the amount of liquid used.

3. In a measuring device for a closed vessel, means for introducing a liquid into the bottom of said vessel to fill the vessel, and means for introducing air under pressure at the top of said vessel for forcing the liquid out of the vessel, and means for measuring the amount of liquid so used to ascertain the capacity of the vessel.

4. In combination, a receptacle for holding a liquid to be used in measuring a vessel, said receptacle being positioned above the vessel to be measured to provide a pressure head, means for connecting said receptacle to the bottom of said vessel, and means for connecting the top of said vessel alternately with the atmosphere, and with a source of pneumatic pressure sufficiently strong to force the liquid from said vessel into said receptacle against said pressure head.

5. In combination, a receptacle for holding a liquid to be used in measuring a vessel, means for connecting said receptacle to the bottom of said vessel, means for connecting the top of said receptacle alternately with the atmosphere, and with a source of pneumatic pressure, and means for preventing the flow of liquid through the last said means.

6. In combination, means for connecting a vessel with a source of liquid supply adapted to extend through an opening in said vessel, means for sealing the opening about said connecting means, said sealing means having an opening therethrough adapted to connect the interior of the vessel, either with the atmosphere or with a source of pneumatic pressure sufficiently strong to force the liquid from said vessel into said source of liquid supply.

7. A device of the character described, comprising a tank, a flexible pipe connected with said tank, a valve for controlling the flow of liquid through said pipe, means connected with said pipe adapted to be inserted into a vessel to be measured, means for connecting the vessel alternately with the atmosphere and with a source of pneumatic pressure, and means for preventing the escape of liquid from said vessel.

8. A device of the character described, comprising means for supplying liquid to a vessel, means for connecting said vessel alternately with the atmosphere and with a source of pneumatic pressure, and means for indicating when the vessel has been filled by the liquid.

9. A device of the character described, comprising a source of liquid supply, means for connecting said source with a vessel to be measured, means for sealing the vessel, and means for connecting the vessel alternately with the atmosphere, and with a source of pneumatic pressure sufficiently strong to force the liquid from said vessel into said source of liquid supply.

10. A device of the character described, comprising a source of liquid supply, means for connecting the source of supply to the bottom of a vessel, means for sealing the vessel, means for connecting the top of the vessel alternately with the atmosphere and with a source of pneumatic pressure, and means for preventing the escape of liquid through the last said means.

11. A device of the character described, comprising a source of supply for a liquid, means for connecting the source of supply to the bottom of a vessel, a valve for controlling said connecting means, means for sealing the vessel to be measured, a passage through said sealing means adapted to communicate alternately with the atmosphere and with a source of pneumatic pressure, and means for preventing the escape of liquid through said passage, but permitting the escape of air therethrough.

12. A device for measuring the capacity of vessels, comprising a receptacle for a liquid, means for detachably connecting said receptacle with the various vessels to be measured, whereby a number of vessels may be successively connected to said receptacle, means for controlling said connecting means, means for forcing the liquid from said vessel into said receptacle after the vessel has been measured, and means for indicating the amount of liquid transferred from the receptacle to the vessel.

13. A device of the character described, comprising a receptacle, flexible means for connecting said receptacle with the bottom of a vessel to be measured, a valve for controlling said connecting means, means for sealing the vessel, means for connecting the top of the vessel with the atmosphere to allow the escape of air from the vessel, and means for preventing the escape of liquid from the vessel through the last said means and means for returning the liquid from the vessel to the receptacle.

14. In a device of the class described, a tank, a flexible tube communicating with said tank, a pipe attached to said flexible tube and adapted to be inserted into a vessel to be measured, means for controlling the passage of liquid through said pipe, a bunging device adapted to seal the opening about said pipe into said vessel, said bunging device having an opening therethrough, and means for connecting said opening with a source of pneumatic pressure sufficiently strong to force the liquid from said vessel into said tank.

15. In a device of the class described, a tank, a flexible tube communicating with said tank, a pipe attached to said flexible tube and adapted to be inserted into a vessel to be measured, means for controlling the passage of liquid through said pipe, a bunging device adapted to seal the opening about said pipe into said vessel, said bunging device having an opening therethrough, means for connecting said opening with a source of pneumatic pressure, and means for preventing the flow of liquid from said vessel through said opening, but permitting the flow of air therethrough.

16. In a device of the class described, a tank, a flexible tube communicating with said tank, a pipe attached to said flexible tube and adapted to be inserted into a vessel to be measured, means for controlling the passage of liquid through said pipe, a bunging device adapted to seal the opening about said pipe into said vessel, said bunging device having an opening therethrough, means for connecting said opening alternately with the atmosphere and with a source of pneumatic pressure, and means in said connecting means for preventing the flow of liquid through said connecting means, but permitting the flow of air therethrough.

17. A device for measuring the capacity of vessels, comprising a receptacle, a gage for indicating the amount of liquid in said receptacle, a flexible pipe connected with said receptacle, means for connecting said flexible pipe with the bottom of the vessel to be measured, a valve for controlling the flow of liquid through said means, a bunging device for closing the opening in the vessel, said bunging device having an opening therethrough, means for connecting said opening alternately with the atmosphere and with a source of pneumatic pressure, means for preventing the flow of liquid from the vessel to the atmosphere, but permitting the escape of air from the vessel to the atmosphere, and means for indicating when the vessel has been filled with liquid.

In testimony whereof I have signed my name to this specification, in the presence of two subscribing witnesses, on this 16th day of December A. D. 1914.

CHRIST MAUL.

Witnesses:
N. WM. LEWIS,
S. J. WIEBERS.